(12) United States Patent
Choi et al.

(10) Patent No.: US 9,295,957 B2
(45) Date of Patent: Mar. 29, 2016

(54) PROCESS TO REDUCE ACIDITY OF CRUDE OIL

(75) Inventors: Ki-Hyouk Choi, Dhahran (SA); Ali Al-Shareef, AlNasira-Qatif (SA)

(73) Assignee: SAUDI ARABIAN OIL COMPANY (SA)

(*) Notice: Subject to any disclaimer, the term of this patent is extended or adjusted under 35 U.S.C. 154(b) by 2042 days.

(21) Appl. No.: 12/277,268

(22) Filed: Nov. 24, 2008

(65) Prior Publication Data

US 2009/0159504 A1 Jun. 25, 2009

Related U.S. Application Data

(60) Provisional application No. 60/990,662, filed on Nov. 28, 2007, provisional application No. 60/990,648, filed on Nov. 28, 2007, provisional application No. 60/990,658, filed on Nov. 28, 2007, provisional application No. 60/990,670, filed on Nov. 28, 2007, provisional application No. 60/990,641, filed on Nov. 28, 2007.

(51) Int. Cl.
*C10G 29/16* (2006.01)
*B01J 3/00* (2006.01)
(Continued)

(52) U.S. Cl.
CPC . *B01J 3/008* (2013.01); *C10G 9/00* (2013.01); *C10G 31/08* (2013.01); *C10G 45/26* (2013.01); *C10G 47/32* (2013.01); *C10G 75/00* (2013.01); *E21B 43/16* (2013.01); *C10G 2300/1033* (2013.01); *C10G 2300/202* (2013.01); *C10G 2300/205* (2013.01); *C10G 2300/206* (2013.01); *C10G 2300/4081* (2013.01); *C10G 2300/805* (2013.01)

(58) Field of Classification Search
USPC ............... 208/263, 106, 130–132, 244, 253, 208/254 R, 208 R, 49, 56, 57
See application file for complete search history.

(56) References Cited

U.S. PATENT DOCUMENTS 3,960,706 A * 6/1976 McCollum et al. ....... 208/254 H
3,989,618 A 11/1976 McCollum et al.
(Continued)

FOREIGN PATENT DOCUMENTS

EP 0978552 A2 2/2000
EP 1862527 A1 12/2007
(Continued)

OTHER PUBLICATIONS

Adschiri et al. "Hydrogenation through Partial Oxidation of Hydrocarbon in Supercritical Water", published on Int. J. of the Soc. of Mat. Eng. for Resources, vol. 7, No. 2, pp. 273-281, (1999).
(Continued)

*Primary Examiner* — Michelle Stein
(74) *Attorney, Agent, or Firm* — Bracewell LLP; Constance Gall Rhebergen

(57) ABSTRACT

A process to reduce the acidity of acidic crude oils for preventing corrosion during processing of the crude oils, including transferring through pipe lines, tanker ships and tank vehicles. Crude oil having substantial amount of organic acid, in particular, naphthenic acid compounds is contacted with supercritical water and a catalyst for deacidification. A treated crude oil product has lower amounts of organic acid compounds than the original crude oil.

26 Claims, 4 Drawing Sheets

(51) Int. Cl.
*C10G 9/00* (2006.01)
*C10G 31/08* (2006.01)
*C10G 45/26* (2006.01)
*C10G 47/32* (2006.01)
*C10G 75/00* (2006.01)
*E21B 43/16* (2006.01)

(56) References Cited

U.S. PATENT DOCUMENTS

| | | | |
|---|---|---|---|
| 4,448,251 A | | 5/1984 | Stine |
| 4,483,761 A | | 11/1984 | Paspek, Jr. |
| 4,543,177 A | | 9/1985 | Murthy et al. |
| 4,543,190 A | * | 9/1985 | Modell ......................... 210/721 |
| 4,818,370 A | * | 4/1989 | Gregoli et al. ................ 208/106 |
| 4,840,725 A | * | 6/1989 | Paspek ........................... 208/130 |
| 5,096,567 A | | 3/1992 | Paspek, Jr. et al. |
| 5,316,659 A | | 5/1994 | Brons et al. |
| 5,871,636 A | | 2/1999 | Trachte et al. |
| 5,871,637 A | * | 2/1999 | Brons ........................... 208/283 |
| 5,904,839 A | | 5/1999 | Brons |
| 5,914,031 A | | 6/1999 | Sentagnes et al. |
| 5,928,502 A | | 7/1999 | Bearden et al. |
| 6,325,921 B1 | | 12/2001 | Andersen |
| 6,547,957 B1 | | 4/2003 | Sudhakar et al. |
| 6,767,452 B1 | | 7/2004 | Siskin et al. |
| 2001/0035006 A1 | * | 11/2001 | Dou et al. ....................... 60/274 |
| 2002/0173682 A1 | | 11/2002 | Tullio et al. |
| 2003/0168381 A1 | | 9/2003 | Hokari et al. |
| 2006/0011511 A1 | * | 1/2006 | Hokari et al. ................ 208/106 |
| 2009/0008291 A1 | * | 1/2009 | Chabot et al. ................... 208/57 |

FOREIGN PATENT DOCUMENTS

| | | |
|---|---|---|
| JP | 2000-104311 | 9/1998 |
| JP | 2000-109850 | 10/1998 |
| JP | 2001-192676 | 1/2000 |
| JP | 2003-277770 | 3/2002 |
| JP | 2003-049180 | 2/2003 |
| WO | 02072735 A2 | 9/2002 |
| WO | 2006-037368 A1 | 4/2006 |
| WO | 2009085436 A1 | 7/2009 |
| WO | 2009085461 A1 | 7/2009 |

OTHER PUBLICATIONS

Adschiri et al. "Catalytic Hydrodesulfurization of Dibenzothiophene through Partial Oxidation and a Water-Gas Shift Reaction in Supercritical Water", published on Ind. Eng. Chem. Res., vol. 37, pp. 2634-2638, (1998).

Zhao et al. "Experimental Study on Vacuum Residuum Upgrading through Pyrolysis in Supercritical Water", published on Energy & Fuels, vol. 20, pp. 2067-2071, (2006).

M.A. McHugh & V.J. Krukonis "Supercritical Fluid Extraction", 2nd ed., Butterworth-Heinemann, (1994), pp. 339-416.

Bob Williams "Refiners' Future Survival Hinges on Adapting to Changing Feedstocks, Product Specs", Oil & Gas Journal, vol. 101, No. 31, (2003).

Laredo et al. "Identification of Naphthenic Acids and Other Corrosivity-related Characteristics in Crude Oil and Vacuum Gas Oils from a Mexican Refinery", Energy & Fuels, vol. 18, pp. 1687-1694, (2004).

N.A. Tomczyk & R.E. Winans "On the nature and Origin of Acidic Species in Petroleum. 1. Detailed Acid Type Distribution in a California Crude Oil", Energy & Fuels, vol. 15, pp. 1498-1504, (2001).

Saab et al. "Quantitative Extraction Procedure of Naphthenic Acids Contained in Crude Oils. Characterization with Different spectroscopic Methods", Energy & Fuels, vol. 19, pp. 525-531, (2005).

Hemmingsen et al. "Structural Characterization and Interfacial Behavior of Acidic Compounds Extracted from a North Sea Oil", Energy & Fuels, in press, (2006).

Watanabe et al. "Decomposition of a Long Chain Saturated Fatty Acid with Some Additives in Hot Compressed Water", Energy Conversion and management, in press, (2006).

* cited by examiner

PROCESS TO REDUCE ACIDITY OF CRUDE OIL

RELATED APPLICATIONS

This patent application claims priority to U.S. Provisional Patent Application Ser. Nos. 60/990,670; 60/990,641; 60/990,662; 60/990,648; and 60/990,658 filed on Nov. 28, 2007, which are all incorporated by reference in their entirety.

FIELD OF THE INVENTION

The present invention relates to a method for reducing the acidity of highly acidic crude oils by treatment with supercritical water in the presence of a metal oxide catalyst. More particularly, the present invention relates to a method for deacidification of highly acidic crude oil to reduce the tendency for corrosion of metal surfaces during transportation, storage, and processing by conventional refining processes. The present invention also achieves: a viscosity decrease, a density decrease (such as vis-breaking), sulfur removal, nitrogen removal and metals removal. Advantageously, crude oil is upgraded and API gravity is improved.

DESCRIPTION OF THE RELATED ART

Increasing demand for petroleum feedstocks and decreasing quality of available crude oils require upgrading of crude oils having low quality to be processed by currently available refining processes. In particular, highly acidic crude oils must be processed to provide for the rapidly increasing demand for hydrocarbon resources.

Highly acidic crude oils raise many problems during transportation, storage and refining processes due to its strong tendency for corrosion. Corrosion of metal surfaces requires frequent changes of corroded parts or using expensive refractory metals. Metallic compounds segregated by corrosion also cause serious plugging problems in piping.

Representative organic acid compounds are known to be naphthenic acid which have carboxylic acid functional group on hydrocarbon molecules of long chain paraffin having cyclopentane. However, detailed analysis of acidic compounds contained in acidic crude oils revealed a wide variation of chemical compositions and structures of acidic compounds. Most of them have carboxylic acid functional groups.

Therefore, crude oil containing large amount of organic acid has low economic value due to difficulties in processing it.

Acidity of crude oil is measured through titration with potassium hydroxide to estimate total acid number ("TAN") as milligram of KOH required to titrate one gram of crude oil. Crude oils having a TAN over 0.3 are generally regarded as acidic crude oils. This definition can change between countries or a lower TAN can be specified for an end product. The current invention addresses acid in crude and is thus generally useful when acid is to be reduced.

Water's critical point is 374° C. and 22.1 MPa. Above these conditions it becomes supercritical and phase boundaries between liquid and gas disappear. Supercritical water has various uncommon properties, differing from subcritical water. Supercritical water has very high solubility toward organic compounds and infinite miscibility with gases.

A number of methods have been suggested to deacidify acidic petroleum oil. Basic compounds were added to neutralize acidity of petroleum oils. Polymeric compounds having enough basicity to trap or neutralize acidic compounds in crude oil were also used to decrease acidity of crude oils. Naphthenic acid compounds, which are representative acidic compounds found in crude oil, can also be converted to esteric compounds through reaction with alcoholic compounds in the presence or absence of catalyst. Extractive separation is known for separating organic acidic compounds, including naphthenic acid compounds, from petroleum oil. Various solvents were tried to separate organic acidic compounds, such as salt and water-oil emulsion which contained concentrated naphthenic acid compounds. Catalytic processes have also been evaluated, typically with mild reaction conditions. Similarly, known processes tend to treat merely a cut of the crude stream and not the whole crude stream. In order to protect metal surface from corrosion, corrosion inhibitors can be used to passivate metal surface prior to being subject to acidic crude oil. Organic polysulfide or phosphites or phosphoric acid were proposed to have good performance to form protective film on metal surface.

A process is needed whereby acidic crude can be deacidified at the on-site production facility or otherwise near to the wellhead. It would be advantageous to propose a process that treats the whole crude stream as opposed to merely a cut of the crude feed.

U.S. Pat. No. 6,325,921 B1 (Andersen) discloses a method of removing metal impurities contained in heavy petroleum feedstocks by processing a particular cut of the crude oil with supercritical water in the presence of a solid catalyst. Andersen teaches fractionation to produce an atmospheric residue which is then treated with zirconium oxide catalyst. Fractionation is typically performed within a refinery and not at the site of production. Thus, Andersen would transport corrosive acidic crude to the refinery site. Furthermore, Andersen teaches the exposure of the fractionation column to acidic crude, thus resulting in a costly refining process. Finally, the Andersen method suffers from the production of sludge and coke formation that can quickly plug lines.

U.S. Pat. No. 4,840,725 (Paspek et al) discloses a process for conversion of high boiling hydrocarbon to low boiling petroleum with water of supercritical condition in the absence of catalyst. Paspek does not teach the removal of acidic compounds nor would the process as taught by Paspek remove such compounds. Furthermore, Paspek does not teach treating the crude at the on-site production facility, so the crude identified in Paspek must be transported, which would lead to corrosion when the crude is acidic. Finally, the method of Paspek suffers from the formation of coke, although the amount produced is less than conventional methods.

U.S. Pat. No. 4,818,370 (Gregoli et al) discloses a process for converting heavy hydrocarbon, such as tars and bitumen to light hydrocarbon by supercritical water in the presence of brine.

As discussed in the Description of the Related Art section, there are a number of problems associated with simply deacidifing acidic crude oils. Representative organic acidic acids are naphthenic acid compounds having carboxylic acid functional groups on hydrocarbon. Acidity of such acidic compounds can be decreased or removed by neutralization with basic chemicals, converting to esters through reaction with alcohol, and extractive separation by using polar solvent. Treatment of such acidic functional group with catalyst in the presence or absence of hydrogen can be also effective to remove strong acidity of carboxylic acid. However, methods to deacidify highly acidic crude oils disclosed in the prior art need special chemicals which are not present in the original crude oil, or complicated processes which cannot be conducted at an on-site production facility. Additionally, methods disclosed in the prior art either degrade the quality of the crude oil or otherwise do not significantly improve or upgrade other qualities of crude oil, such as viscosity, density, and sulfur and metals content.

Basic compounds were added to neutralize acidity of petroleum oils. Polymeric compounds having enough basicity to trap or neutralize naphthenic acid were also used to decrease acidity of crude oils. But, those methods require use of expensive neutralizing agent, which is not easily recovered from deacidified products.

Naphthenic acid compounds, which are representative acidic compounds found in crude oil, can also be converted to esteric compounds through known reaction with alcohol compounds in the presence or absence of catalyst. This technique suffers drawbacks of the consumption of alcohols as well as instability of the esteric compounds related to conversion to carboxylic acid compounds through hydrolysis.

Extractive separation is also known separate naphthenic acid compounds from petroleum oil. Various solvents have been used to separate naphthenic acid compounds or their derivatives, such as salt and water-oil emulsion which contained concentrated naphthenic acid compounds. But, solvent extraction requires large amount of solvent, which is not easily recycled because solvent has high affinity toward organic acidic compounds. Also, the naphthenic compound is fully removed including the valuable hydrocarbon portion along with additional valuable hydrocarbon components dissolved into the solvent.

In order to protect metal surface from corrosion, corrosion inhibitors have been proposed to passivate metal surface. Organic polysulfide or phosphites or phosphoric acid were proposed to provide good performance to form protective film on metal surface. This technique suffers from the expense of the injection and re-injection of inhibitors in order to maintain sufficient thickness of protective film. Also, each metal item contacting the acidic crude must be contacted with an operable amount of the corrosion inhibitor to be treated, instead of merely removing the problematic functional group from the crude.

These and other techniques are known in the art to either deacidify an acidic crude or to protect equipment from corrosion from acidic crude. Deacidifying processes are commonly at the refinery. At the refinery, hydrogen tends to be readily available. Since many deacidification processes require hydrogen, this dictates that such processes be performed at the refinery and not at the production site. However, this creates corrosion problems in pipeline and transportation vehicles as well as all contacted equipment between the production well and the refinery. It would be advantageous to remove the acidic functionality on-site at the production facility. Many known applications for deacidification include the use of hydrogen. As hydrogen is not generally available at a production site, it would be advantageous to deacidify at the production site in the absence of externally added hydrogen.

Known techniques also typically treat a cut of the hydrocarbon stream. While this may reduce the volume to be treated for acidity, it creates additional capital expense through separation treatment (i.e. fractionation tower) all of which is susceptible to corrosion. It would be useful to treat the whole crude to minimize capital costs, processing cost and corrosive exposure. It would be advantageous to deacidify the hydrocarbon stream prior to transportation and processing by conventional refining processes.

Thus, there are a number of shortcomings relating to deacidifying acidic crude oils. Acidity is one of the most challenging properties of crude oils. Deacidification of petroleum oil requires expensive neutralizing chemicals, use of solvents, and increases impurities in petroleum oil. Furthermore most of methods disclosed in the prior arts do not improve the crude in any other manner and often results in permanent loss of valuable additive or crude. Neutralization followed by solvent extraction results in loss of valuable petroleum oil. Catalytic treatment of crude alone or a cut of crude at elevated temperature is prone to form coke on catalyst surfaces which decreases catalytic activity very quickly.

SUMMARY OF THE INVENTION

Accordingly, a need has arisen for an on-site production facility to have an efficient and simple method to deacidify highly acidic crude oils to reduce corrosion of metal surfaces coming into contact with the crude, such as is generally encountered during transporting and processing of acidic crude oil.

In accordance with present invention, supercritical water and metal oxide catalysts are utilized to reduce acidity of acidic crude oils, in particular by decarboxylation in the presence of metal oxide catalyst.

The process described herein reduces acidity of acidic crude oils for preventing corrosion during processing of the crude oils, including: transferring through pipe lines, tanker ships and tank vehicles. Crude oils having substantial amounts of organic acid, in particular, naphthenic acid compounds, are contacted with supercritical water and metal oxide catalysts for deacidification. The treated crude oil product has lower amounts of organic acid compounds than the original acidic crude oil.

Accordingly, an embodiment of the present invention includes contacting highly acidic crude oil with supercritical water in the presence of a metal oxide catalyst for decomposition of organic acidic compounds included in the highly acidic crude oil. Additionally, impurities contained in acidic crude oil, such as sulfur, nitrogen and metallic compounds, are also removed. Furthermore, the present invention results in an improvement of API gravity to more light and middle range distillates. Still further, the viscosity of the treated crude oil is also decreased.

One embodiment of the invention is a process for reducing the acidity of an acidic crude oil, which includes obtaining a petroleum reservoir supply of acidic crude oil having a TAN of at least about 0.3. Acidic oils are generally regarded to be oils with a TAN at or above 0.3. Notably, the invention lowers acidity of oils that do not have TAN above 0.3 if removal is still deemed desirable. Advantageously, the process of the invention can be practiced near to the petroleum reservoir at an on-site production facility.

The embodiment includes mixing the acidic crude oil with water at a weight ratio (as measured at room temperature) of about 10:1 to about 1:50, or more preferably 10:1 to about 1:10, to form a crude oil/water mixture. The crude oil/water mixture can be heated to a crude oil/water temperature in the range of about 10° C. to about 150° C. to form a pumpable crude oil/water mixture. The pumpable crude oil/water mixture is then pumped to a pressure of at least about 22.1 MPa to form a pressurized crude oil/water mixture. Target pressure for the pumpable crude oil/water mixture is at or above the critical pressure of water. The pressurized crude oil/water mixture is preferably heated to a pressurized temperature in the range of about 150° C. to about 400° C. or more preferably between 150° C. to 350° C. in a heating zone. The pressurized crude oil/water mixture is then contacted with a metal oxide catalyst in a reaction zone, wherein the reaction zone includes a main reactor having an interior portion, and heated to a reaction temperature range of about 374° C. to about 600° C. In a preferred embodiment, heating is performed in the heating zone followed by heating in the reaction zone, although these zones can be combined into one element. The temperature in the reaction zone is generally at or above the temperature of supercritical water, with a range of 400° C.-500° C. being preferred. Pressure is maintained at or above at least about 22.1 MPa, which is the critical pressure of water. The pressurized crude oil/water mixture is contacted with the catalyst for a reaction period of time operable to produce a treated crude oil having a significantly reduced TAN in comparison to the TAN of the acidic crude oil. Depending upon the TAN specification of the final product, this residence time could be seconds or minutes. In a preferred embodiment, the residence time does not exceed about 90 minutes.

The treated crude oil is removed from the reaction zone under pressure and at high temperature. The treated crude oil can be cooled in a cooler and is subjected to pressure let down or reduction of pressure to create a pressure-reduced treated mixture. Any pressure regulating device known in the art can be used. Pressure regulating devices useful in the invention can be devices known in the art, with a valve being one embodiment and back pressure regulator being another exemplary device. In one embodiment, two or more pressure regulating devices are used in parallel. This advantageously allows one to operate while additional pressure regulating devices are out of service.

The pressure-reduced treated mixture is separated using means generally known in the art into a gas portion and a liquid portion. The liquid portion undergoes further separation to create recovered water and low acidity oil. Oil-water separation can be accomplished with known oil-water separators or separation facilities, such as Gas Oil Separation Plants (GOSP). The low acidity oil is collected from the oil-water separation step. The resulting low acidity oil can exhibit multiple benefits. In addition to the reduction of acidity, upgraded crude oil results from the process. Furthermore, the low acid oil can also have reduced amounts of asphaltene, sulfur, nitrogen or metal containing substances as compared to the acidic crude oil.

The reaction zone of the invention can be any reaction zone known in the prior art. In one embodiment, the reaction zone includes the main reactor, wherein the main reactor has a generally vertically orientation and the pressurized crude oil/water mixture flows downwardly through the generally vertically oriented reactor. In this manner, flow can be gravity assisted and the catalyst is also swept maintaining activity of the catalyst. Flow patterns within a generally vertically oriented reactor zone differ from flow patterns in other orientations.

The pressure-reduced treated mixture contains significant amounts of water in the stream. In one embodiment, the acidic crude oil is mixed with water at a weight ratio of about 10:1 to about 1:10 to form the crude oil/water mixture.

The process of creating the low acidity crude oil can advantageously be conducted without an external supply of hydrogen. In one embodiment the metal oxide catalyst useful in the invention is $ZrO_2$. In addition to reducing the acidic functional groups to create the low acidity crude oil, density and viscosity benefits can be obtained in the process of the invention. The petroleum reservoir supply of acidic crude oil has an initial density and viscosity and an initial concentration of sulfur and heavy metals. The low acidity oil resulting from the process of the invention can have density and viscosity lower than the density and viscosity of the acidic crude oil. Advantageously, the concentration of sulfur and heavy metals in the low acidity oil can also be lower than the concentration of sulfur and heavy metals in the acidic crude oil.

In another embodiment of the invention, the recovered water is recycled by combining at least a portion of the recovered water with the water forming the water feed that is combined with the acidic crude oil to form the crude oil/water mixture. The recovered water can be used directly to supplement the water feed or it can be further treated to remove certain impurities, particularly hydrocarbons in the recovered water. In one embodiment, the recovered water is pumped or otherwise pressurized to a pressure at or above that of supercritical water. The recovered water is also heated to a temperature at or above supercritical water. A source of oxygen is added to the recovered water such that the recovered water with oxygen at or above supercritical react in an oxidation reactor to create a cleaned recovered water stream such that the cleaned recovered water stream contains substantially less hydrocarbon content than the recovered water. The oxidation reactor releases thermal energy. In one embodiment, this thermal energy is used elsewhere in the process to gain efficiencies. The thermal energy or a portion thereof is transferred through heat exchange upstream in the process for reducing the acidity of an acidic crude oil. Examples would be to provide heat to the water for the water feed, acidic crude oil, or any heater in the process. Exemplary sources of oxygen include air, liquefied oxygen, hydrogen peroxide, organic peroxide and combinations of the same.

Advantageously, the process can be conducted at an on-site production facility to avoid corrosion issues related to transporting acidic crude oil.

In another embodiment of the invention, the acidic crude oil is pumped to a pressure at or exceeding the critical pressure of water to create pressurized acidic crude oil, the pressurized acidic crude oil being maintained at a temperature not to exceed 150 degrees C. A supply of water is separately obtained and the water is pumped to a pressure at or exceeding the critical pressure of water. The water is also heated to a temperature at or above the critical temperature of water to create pressurized water. The heated, pressurized-water and the acidic crude stream are then mixed to form a pressurized crude oil/water mixture. This pressurized crude oil/water mixture is pre-heated in the heating zone to about 150° C. to about 400° C. or preferably between 150° C. to 350° C. to form a pre-heated mixture. The preheated mixture is contacted with the metal oxide catalyst in the reaction zone and heated to between about 374° to about 600° C. while maintaining pressure at least at or above about 22.1 MPa for a reaction period of time operable to produce a treated crude oil having a significantly reduced TAN in comparison to the TAN of the acidic crude oil. This process can advantageously be conducted without an external supply of hydrogen.

BRIEF DESCRIPTION OF THE DRAWINGS

So that the manner in which the above-recited features, aspects and advantages of the invention, as well as others that will become apparent, are attained and can be understood in detail, more particular description of the invention briefly summarized above may be had by reference to the embodiments thereof that are illustrated in the drawings that form a part of this specification. It is to be noted, however, that the appended drawings illustrate only preferred embodiments of the invention and are, therefore, not to be considered limiting of the invention's scope, for the invention may admit to other equally effective embodiments.

DETAILED DESCRIPTION OF THE EXEMPLARY EMBODIMENTS

Figure 1:
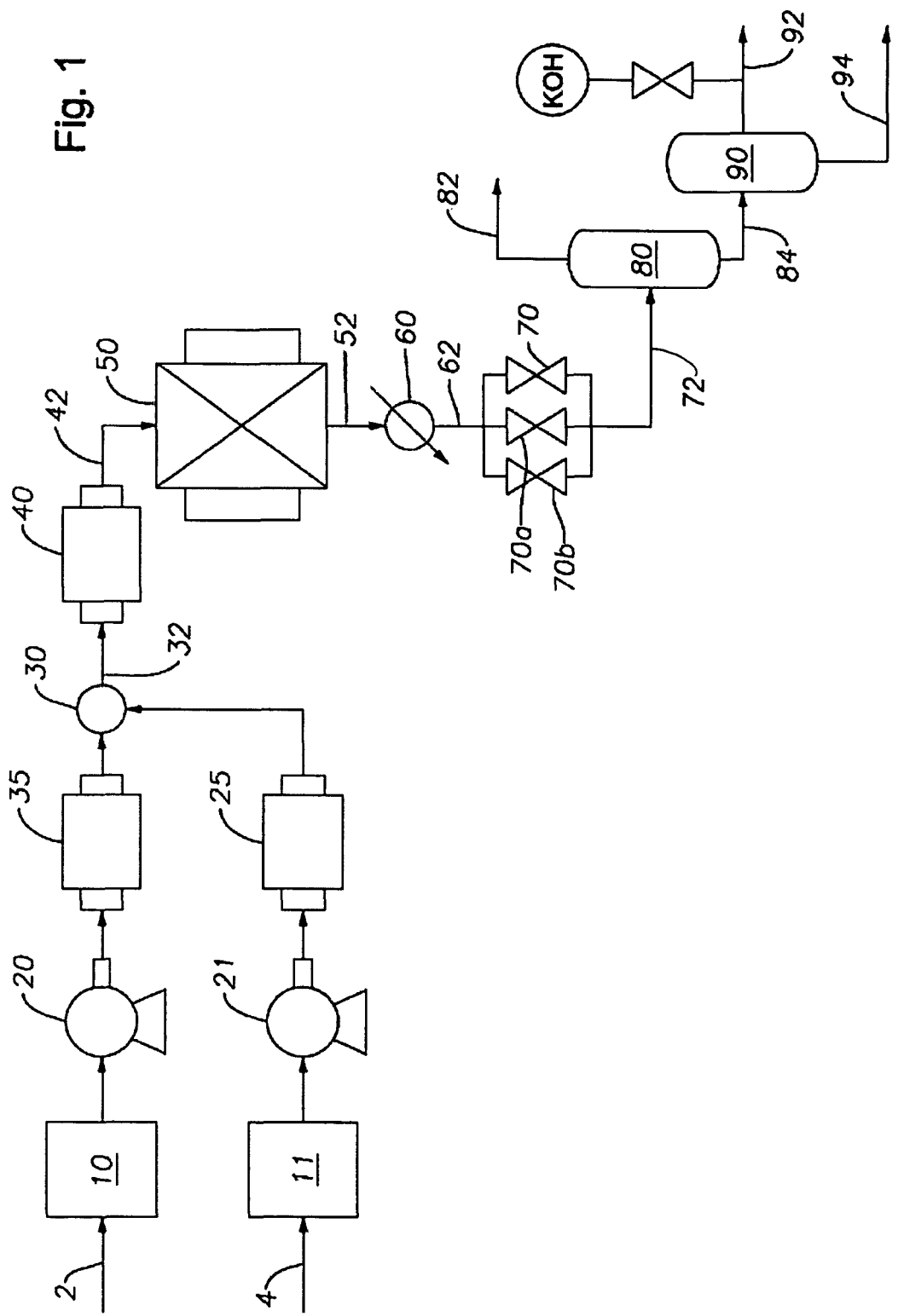
FIG. 1 shows one preferred embodiment of the present invention.

The present invention utilizes supercritical water in the presence of a metal oxide catalyst, without an external supply of hydrogen, in an on-site production facility, to reduce the acidity of acidic crude oils produced from petroleum reservoirs. More particularly, the present invention relates to a method for deacidification, in particular by decarboxylation, of highly acidic crude oil to have much less tendency for corrosion of metal surfaces during transportation, storage, and processing by conventional refining processes. Viscosity decrease, density decrease (believed to be vis-breaking), sulfur removal, nitrogen removal and metals removal are also achieved at the same time without formation of substantial amounts of coke.

One embodiment includes the use of the whole acidic crude as opposed to merely a cut of the acidic crude oil. Whole crude oil contains a variety of undesirable components. The current invention treats more than just the acidic functionality group. Thus, by treating the whole crude, significant additional advantages are achieved related to upgrading of the acidic crude oil and removal of additional impurities, sulfur compounds and metals in addition to the deacidification.

Processes that include deacidification of a cut tend to leave behind the "difficult to treat" components such as asphaltenes (a high percentage of complex cyclic and aromatic compounds), compounds with heavy metals, and high molecular weight compounds which easily form coke. Application of the process of the invention to the whole crude oil provides significant benefits in treating these "difficult to treat" compounds without incurring additional costs The present invention provides an effective method to deacidify highly acidic crude oils using supercritical water and metal oxide catalyst. Naphthenic acid compounds having carboxylic acid functional groups which are responsible for high acidity and strong corrosivity of crude oils are decomposed, converting the carboxylic acid groups to carbon dioxide.

The present invention can be performed in the absence of chemical neutralizing agents, therefore avoiding the expense relating to sacrificing of chemicals to reduce TAN of crude oil. Furthermore, environmentally benign water is useful as reaction medium thus allowing the process to avoid the use of toxic or harmful polar organic or inorganic solvents.

The process advantageously requires no hydrogen facility and thus is useful at the production site of highly acidic crude oil due to its high throughput and no requirement for external supply of hydrogen. The present invention comprises a highly acidic crude oil-water mixing stage, pre-heating stage, main reactor stage, cooling and separating stages. Additionally, organic compounds included in recovered water from the separating stages can be fully oxidized with supercritical water in the presence of oxygen to obtain clean water for recycling and thermal energy which is released from oxidation reaction.

The present invention provides a method to convert highly acidic crude oils to more valuable hydrocarbon feedstocks which have much lower corrosivity and are suitable for currently available processes, including transferring through conventional pipelines, tankers, and refining processes without corrosion. Furthermore, feedstocks obtained by the present invention have good qualities for conventional refining processes to produce petroleum products, such as gasoline and diesel, having low impurity contents. Additionally, the viscosity of the acidic crude oils is also decreased through cracking of hydrocarbons resulting in easier transferring and processing.

In this invention, supercritical water provides a stable reaction medium for decomposition of organic acidic components in acidic crude oils to much lower acidic properties through facilitating high mass diffusion, high heat transfer, intra- or inter-molecular hydrogen transfer, stabilizing radical compounds for suppressing coke formation and removing impurities such as sulfur, nitrogen and metal containing molecules.

With the present invention, along with deacidification, viscosity is reduced, density is reduced, and impurities contained in the feed crude oil, such as sulfur, nitrogen, and metals, are at least partially removed by reaction using supercritical water. The method disclosed in the present invention can be easily utilized at the production site of highly acidic crude oil. Energy can be recovered by heat-exchanging and oxidation to optimize energy input into the process.

Crude oils having a total acid number (TAN) higher than 0.3 are generally considered "acidic crude oils" and have a strong tendency for corrosion. Titration with KOH is generally used to test for the TAN number. In one embodiment of the current invention, KOH titration of the treated oil is used to determine catalyst functioning and optimization of feed throughput. Small variations in TAN are useful in aligning the operating conditions of the process. Large changes in TAN while running at approximately steady state can indicate that the catalyst is reaching the end of its useful run.

FIG. 1 demonstrates a water feed [2] that is fed into a water storage tank [10], where water from the water feed [2] is subsequently pumped through high pressure metering water pump [20] to a water feed pressure at or above 22.1 MPa, preferably between 23 and 25 MPa. In an embodiment, the water feed can be heated to a temperature at or above 374 deg C., more preferably between 400-450 degrees C. Acidic crude oil [4] can be similarly fed into an acidic crude oil storage tank [11], where the acidic crude oil [4] is subsequently pumped through high pressure metering acidic crude oil pump [2]) to an acidic crude oil pressure at or above 22.1 MPa, preferably between 23 and 25 MPa. Acidic crude oil [4] can be heated in pre-heater [25] to an acidic crude oil temperature that promotes flow based on the characteristics of the acidic crude but that does not exceed 150 degrees C. Surprisingly, by maintaining the acidic crude oil below 150 degrees C. at high pressure, cooking can be minimized or eliminated. Above about 150 degrees C., acidic crude oil can begin to form highly viscous petroleum sludge in the pre-heating line, which can also be transformed into solid matter in the main reactor. Solid matter can plug the discharge line and cause unexpected shutdown of the process. The current invention overcomes this issue through temperature control of the acidic crude. Further advantageous elements to avoid coke formation include the orientation of the reaction zone. Water feed [2], now in a supercritical state, is mixed with acidic crude oil [4] through a mixing zone [30]. Mixing zone [30] can be simply a Tee fitting in the line allowing mixing or other mixing devices known in the art. Water feed [2] and acidic crude oil [4] combine at the mixing zone [30] to form crude oil/water mixture [32]. In FIG. 1, crude oil/water mixture [32] is a pressurized crude oil/water mixture stream. The crude oil/water mixture [32] is then fed into a heating zone [40] for pre-heating, wherein the temperature is increased to a temperature within a range of 150 to 400 degrees C., or more preferably a range of 150 to 350 degrees C., to form a pre-heated mixture [42].

The pre-heated mixture [42] is then fed into the reaction zone, which includes main reactor [50] having an interior portion, such that pre-heated mixture [42] contacts the metal oxide catalyst. Further heating can be provided in the reaction zone such that the temperature and pressure are near to or exceed the supercritical point of water and at least some chemical conversion is achieved such that the acidic functional groups are converted to produce treated crude oil having a significantly reduced TAN in comparison to the TAN of the acidic crude oil. Advantageously, at least some of the hydrocarbons of the pre-heated mixture [42] also undergo cracking such that the treated crude oil is also upgraded in comparison to the acidic crude oil.

Advantageously, heating water and acidic oil separately creates a process where the acidic oil is subjected to high temperature for only a short time prior to entering the reactor. In this manner, the formation of coke can be largely prevented.

The acidic functional groups include naphthenic acid groups such as —COOH. This is converted in the presence of the catalyst within the reaction zone to $CO_2$ or the like such that the functional acid group is removed.

Figure 2:
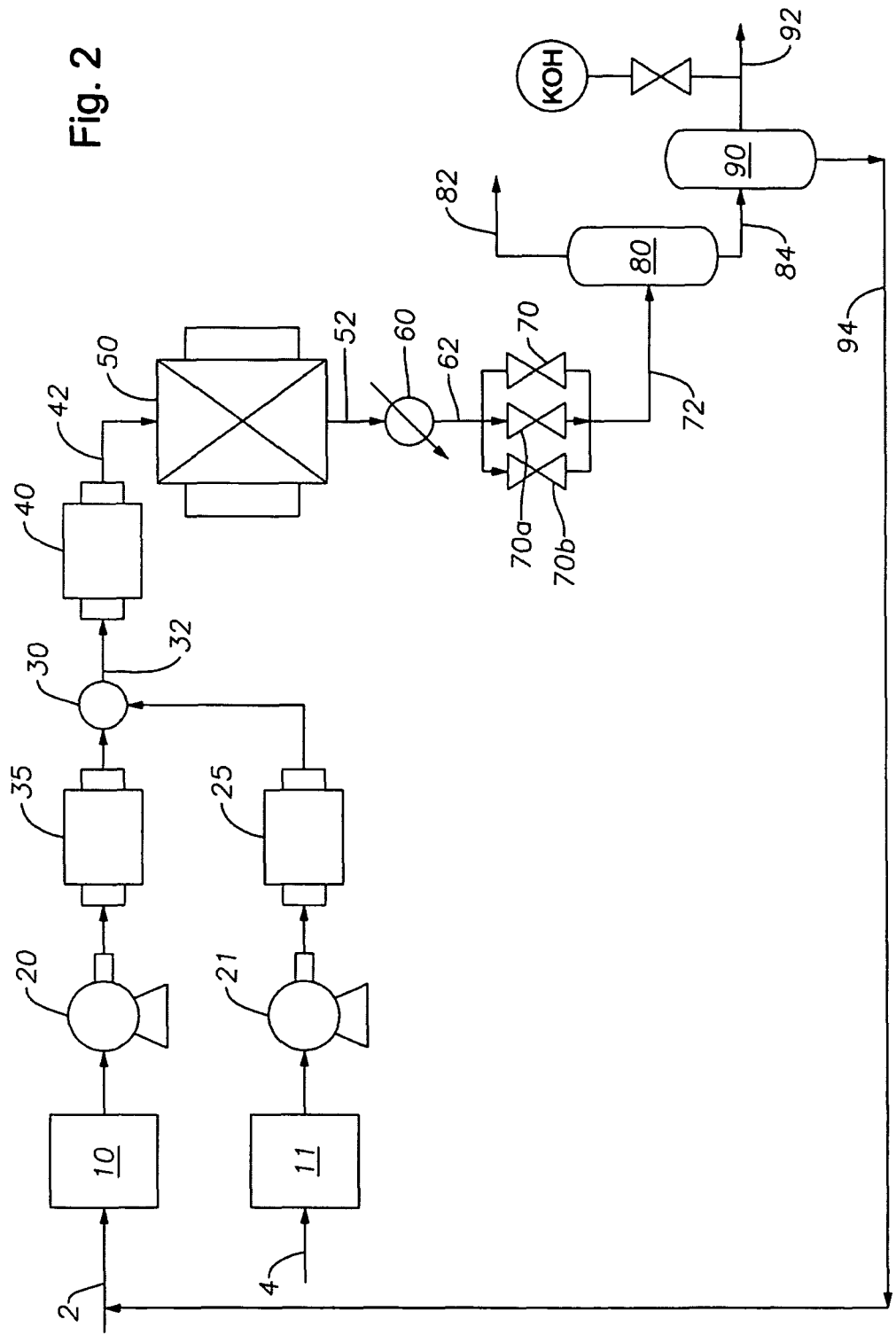
FIG. 2 shows another preferred embodiment of the invention.

The treated crude oil is cooled using any acceptable cooler [60], preferably a heat exchanger, creating a cooled treated crude mixture [62]. The cooled treated mixture [62] is then depressurized using a pressure regulating device [70] to create a pressure-reduced treated mixture [72] or depressurized treated-mixture. The pressure-reduced treated mixture [72] then enters a liquid-gas separator [80], wherein the pressure-reduced treated mixture [72] is separated into a gas portion [82] and a liquid portion [84]. The liquid portion [84] is then fed into an oil-water separation facility [90] or oil-water separator to yield low acidity oil [92] and recovered water [94]. In an alternate embodiment shown in FIG. 2, the recovered water [94] can be recycled upstream in the process to a point before or after the water storage tank [10] and re-used as makeup to the water feed [2].

Figure 3:
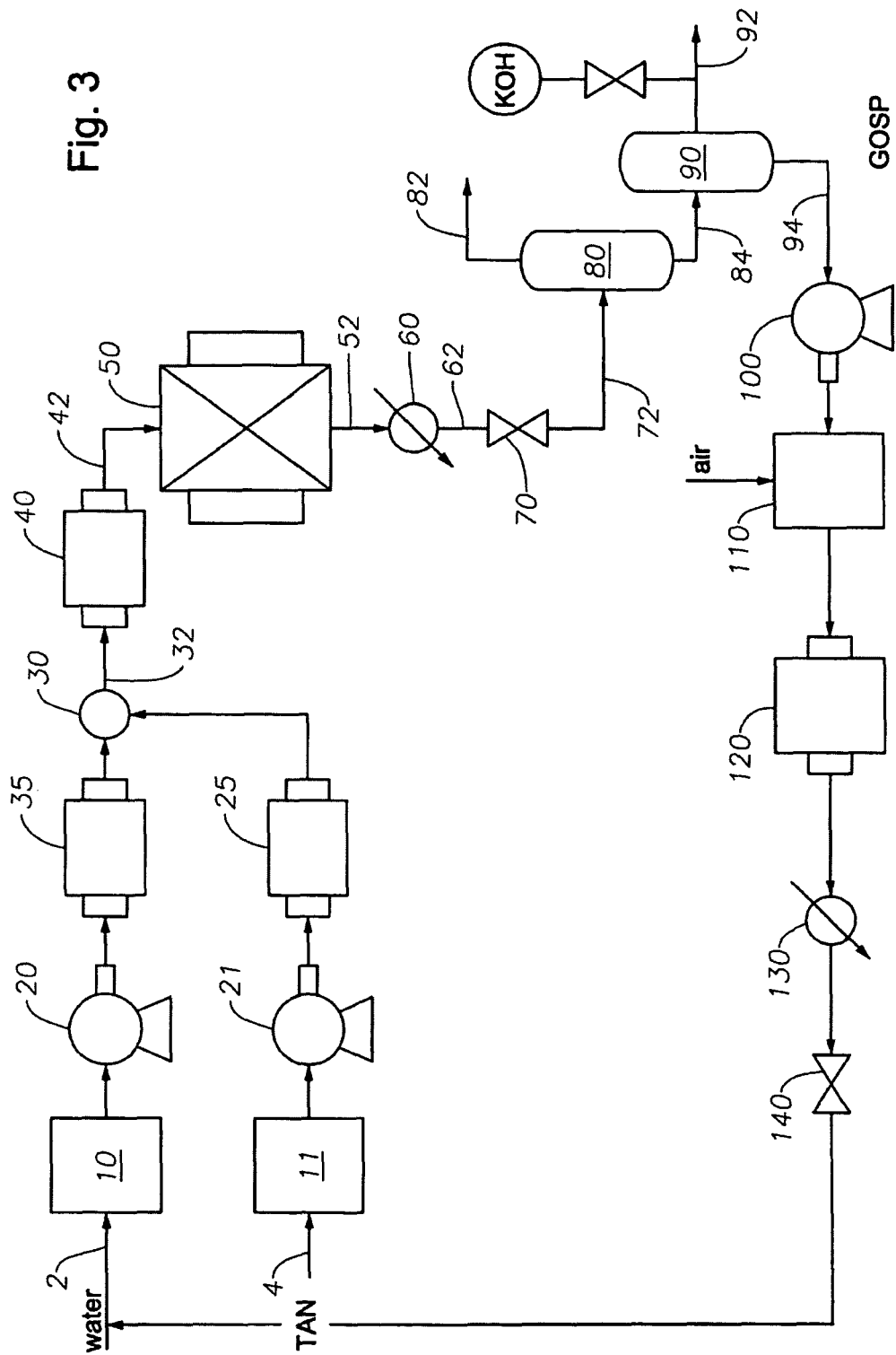
FIG. 3 shows an alternate embodiment of the invention.

FIG. 3 demonstrates an additional embodiment of the invention where the recovered water [94] is pumped in high pressure pump [100] to a pressure at or above that of supercritical water. Recovered water [94] is mixed with air in air mixer [110]. Air mixer [110] can be any type of mixing device known in the art, including injection of air or other oxygen source into a line. Recovered water [94] and air are subjected to reaction in oxidation reactor [120] at temperature and pressure at or above that of supercritical water. This creates a cleaned recovered water stream such that the cleaned recovered water stream contains substantially less hydrocarbon content than the recovered water. This cleaned recovered water stream can then be depressurized through water pressure regulating device [140] to be added to water feed [2] or into water storage tank [10]. Alternately, the recovered water can be maintained at high pressure, thus removing the need for water pressure regulating device [140], and recycled into the process at a point that is already under pressure.

Figure 4:
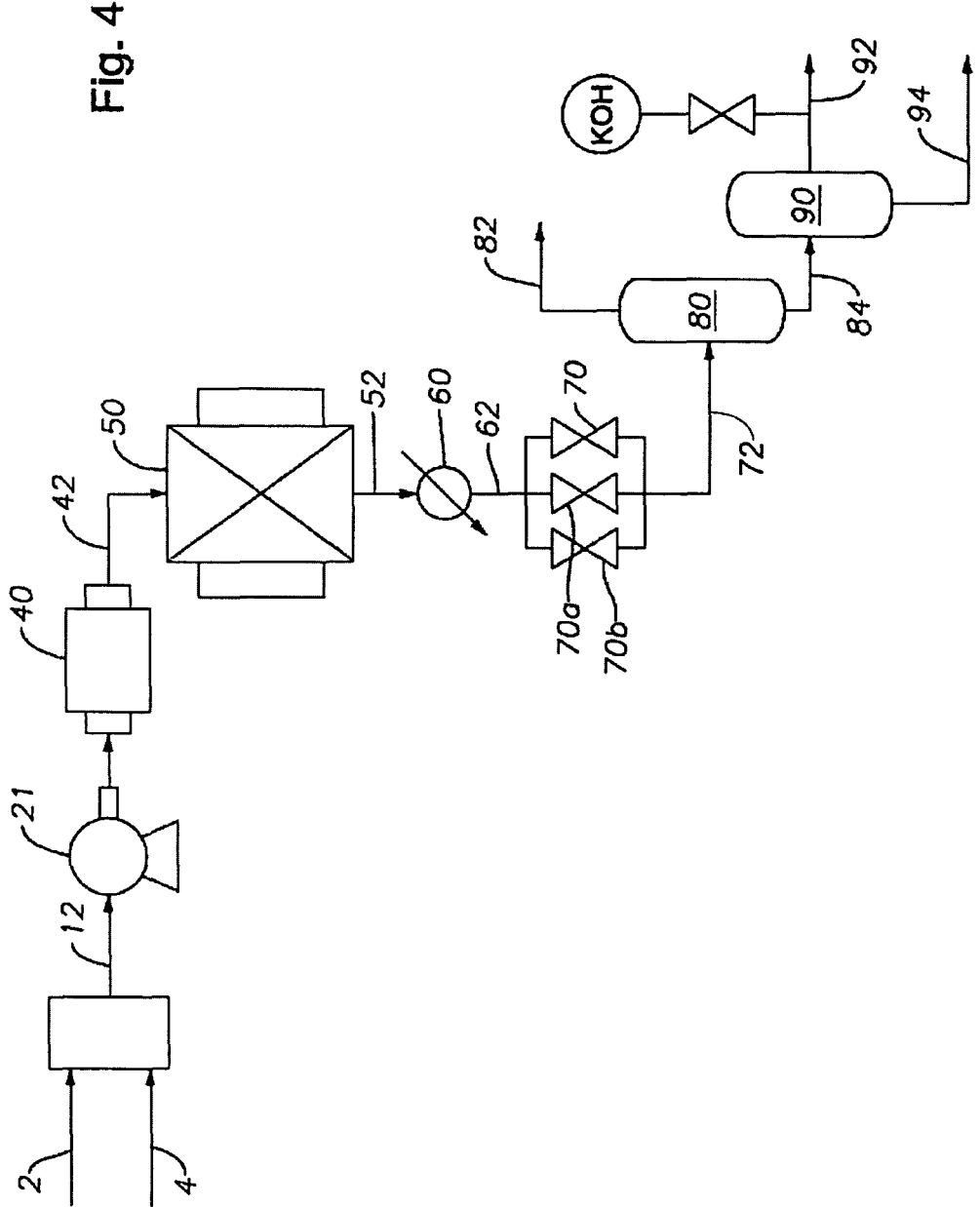
FIG. 4 shows an alternate embodiment of the invention.

FIG. 4 demonstrates an additional embodiment in which water feed [2] and acidic crude oil [4] are mixed together to form crude oil/water mixture [12]. Crude oil/water mixture [12] is pumped to at least the critical pressure of water in high pressure metering acidic crude oil pump [21] and heated to at least the critical temperature of water in heating zone [40]. Preheated mixture [42] enters main reactor [50] of the reaction zone such that pre-heated mixture [42] contacts metal oxide catalyst. Further heating can be provided in the reaction zone such that the temperature and pressure are near to or exceed the supercritical point of water and chemical conversion is achieved such that the acidic functional groups are converted to produce treated crude oil having a significantly reduced TAN in comparison to the TAN of the acidic crude oil.

Advantageously, by increasing the temperature of the combined water and acidic crude oil directly before entering the reactor and/or in the reactor creates a process where the acidic crude oil is subjected to high temperature for only a short time prior to entering the reactor. In this manner, the formation of coke can be largely prevented. The presence of sufficient water as a buffer between hydrocarbon molecules also assists in the avoidance of the formation of coke.

EXAMPLE 1

The process of the present invention is further demonstrated by the following illustrative embodiment which does not limit the claims of the present invention. Illustrative embodiment data represents expected results.

Highly acidic crude oil to which this method is applicable includes Malim oil, produced by PETROBRAS, exemplary properties of which are listed in Table 1.

TABLE 1

| Property | Value |
| --- | --- |
| Density, ° API | 19.2 |
| Sulfur, Total Weight % | 0.78 |
| Solid wastes, weight % | 0.012 |
| Total acidity (mg KOH/g) | 1.26 |
| Asphaltenes, weight % | 2.6 |
| Nitrogen, weight % | 0.49 |
| Vanadium, wt ppm | 25 |
| Nickel, wt ppm | 20 |

The highly acidic crude oil having properties of Table 1 can be processed by the method of the present invention. Highly acidic crude oil is pumped to about 25 MPa and pre-heated to around 50° C. by surrounding crude oil feeding line with electric heater. Water feed line is passed through heat exchanger and then through electric furnace and surrounded with thermal insulator. Crude oil and water streams are combined by a suitable device, such as tee connector or any mixing device known by those of skill in the art, e.g., an impeller. The crude oil/water mixture can be fed into the preheating zone to raise temperature up to between about 250° C. and 400° C., more preferably between about 250° C. and 350° C. The pressurized mixture can be then introduced into main reactor zone while maintaining pressure at about 25 MPa and temperature at about 400° C. Residence time of mixture in main reactor can be adjusted preferably to be between 1 minute and 30 minutes. Exemplary catalyst includes $ZrO_2$ catalyst having specific surface area of 23 m$^2$/g and particle size of 12 mm. Heat optimization can include output from reaction zone in heat-exchange with feed mixture in pre-heating zone or oxidative reactor. Output from heat exchanger can be then fed into liquid-gas separator to create a gas portion [82] and a liquid portion [84]. Here, any suitable liquid-gas separator known by those of skill in the art may be used. Liquid portion [84] from the liquid-gas separator can be then fed into oil-water separator facility [90]. GOSP facilities located close to the production well can be used for this purpose. The low acidity oil produced in this manner can be collected and analyzed. Analysis for TAN can involve titration with KOH or NaOH to determine TAN of the low acidity oil. Estimations of total liquid yield can be above 90.8 weight % with the amount of coke and gas formed during treatment being 3.2 weight and 6.0 weight % of feedstock. Anticipated TAN of low-acid oil is 0.23 with a total sulfur content of 0.54 weight % and complete removal of vanadium contained in feed.

The present inventive process is advantageous over known processes as it provides a process suitable for deacidifing acidic crude oil at an on-site production facility, such that corrosion can be minimized at all downstream equipment.

In one embodiment, the main reactor can be packed with $ZrO_2$ catalyst. The catalyst can be sized to minimize pressure build up in the packed bed, with a large grain being preferred. The main reactor can be preferable vertical with pre-heated feed entering from the top.

Mild heating in the process can be achieved partially by heat exchanging the feed crude oil stream with the product stream from the main reactor if required.

Exemplary heating methods for the acidic crude oil includes tube heater, tracing, jacketing or other methods to increase temperature of feed stream up to 150-350° C. Heating for this purpose can be achieved partially by heat exchanging the feed stream with the product stream from the main reactor as desired.

Reaction zone in one embodiment includes a main reactor surrounded by heater. Reaction zone can be charged with catalyst having one or more of various shapes, such as sphere, trilobe or extrudate. Large sized catalysts are useful in creating free space for fluid flow through the catalyst.

The pre-heated feed stream resides in the main reactor for a relatively short time. It has been found that a residence time of about 1 to 60 minutes is effective to substantially modify TAN number. While longer periods of time are possible, there is a decreasing benefit from the additional time in the main reactor. While it is possible to continue residence time in the reactor for hours, times in excess of 60 minutes are not expected to produce substantial increase in conversion. Most conversion takes place quickly upon entry into the reactor. The pre-heated feed stream preferably is fed from the top of the main reactor such that the stream is gravity assisted in moving through the main reactor.

Product stream from main reactor is then cooled down and released by pressure regulating device.

Cooled product stream is then separated into gas and liquid phase by a series of suitable separators. The gas produced can be removed in traditional manners including to flare or to atmosphere. Liquid portion of product stream is then separated into oil and water phase by oil-water separator techniques.

In one embodiment, recovered water phase from oil-water separator is treated with oxygen under supercritical conditions to remove oily impurities contained in the water phase by oxidation reactor. Oxygen used for this purpose can be supplied from liquefied oxygen gas, hydrogen peroxide, organic peroxide, and air. Product from oxidation reactor has high thermal energy released from oxidation reaction. Therefore, it can be heat exchanged with initial heating to 10° C. to 150° C., and/or feed stream for main reactor and/or water to oxidation reactor. The treated crude oil product recovered from oil-water separator contains much lower amounts of organic acidic compounds. The treated crude oil product contains lower amounts of sulfur, nitrogen, and metallic compounds than the highly acidic crude oil. Therefore, the treated crude oil product is suitable for processing by conventional transferring and refining processed due to its very low corrosivity.

This invention achieved deacidification very efficiently by using supercritical water as a reaction medium and a metal oxide catalyst, which facilitates decomposition of carboxylic group to carbon dioxide. Products from the process disclosed in the present invention contain reduced TAN and furthermore, lower amount of impurities. Additionally, flow properties of the treated crude oil product are improved enough for transfer through conventional pipelines and tankers.

Having described the invention above, various modifications of the techniques, procedures, materials, and equipment will be apparent to those skilled in the art. While various embodiments have been shown and described, various modifications and substitutions may be made thereto. Accordingly, it is to be understood that the present invention has been described by way of illustration(s) and not limitation. It is intended that all such variations within the scope and spirit of the invention be included within the scope of the appended claims.

What is claimed is:

1. A process for reducing the acidity of an acidic crude oil, comprising the steps of:
   obtaining a petroleum reservoir supply of acidic crude oil, wherein the petroleum reservoir has an on-site production facility;
   mixing the acidic crude oil with water at an oil:water weight ratio of about 10:1 to about 1:50 to form a crude oil/water mixture, such mixing operable to occur at the on-site production facility;
   heating the crude oil/water mixture to a crude oil/water temperature in the range of about 10° C. to about 150° C. to form a pumpable crude oil/water mixture;
   pumping the pumpable crude oil/water mixture to a pressure of at least about 22.1 MPa to form a pressurized crude oil/water mixture;
   pre-heating the pressurized crude oil/water mixture to a pressurized temperature in the range of about 150° C. to about 350° C.;
   contacting the pressurized crude oil/water mixture with a metal oxide catalyst in a reaction zone, wherein the reaction zone comprises main reactor having an interior portion;
   heating the pressurized crude oil/water mixture to a reaction temperature range of about 374° to about 600° C. while maintaining the pressure at or above at least about 22.1 MPa for a reaction period of time operable to produce a treated crude oil having a significantly reduced TAN in comparison to the TAN of the acidic crude oil;
   reducing the pressure of the treated crude oil using a pressure regulating device to create a pressure-reduced treated mixture;
   separating the pressure-reduced treated mixture into a gas portion and a liquid portion;
   separating the liquid portion into recovered water and low acidity oil; and
   collecting the low acidity oil wherein the low acidity oil is an upgraded crude oil having reduced amounts of asphaltene, sulfur, nitrogen or metal containing substances as compared to the acidic crude oil.

2. The process of claim 1 where the acidic crude oil has a TAN of at least about 0.3.

3. The process of claim 1, wherein the main reactor is generally vertically in orientation, such that the pressurized crude oil/water mixture flows downwardly through the vertically oriented reactor, such that the pressurized crude oil/water mixture flows downwardly through the reaction zone.

4. The process of claim 1, wherein the step of separating the liquid portion into recovered water and low acidity oil further comprises the step of feeding the pressure-reduced treated mixture to an oil-water separation facility, such that the low acidity oil is generally separated from the water.

5. The process of claim 1, wherein the step of mixing the acidic crude oil with water is conducted at an oil:water weight ratio of about 10:1 to about 1:10 to form a crude oil/water mixture.

6. The process of claim 1, wherein the pressure regulating device comprises at least one pressure regulating device.

7. The process of claim 1, wherein the process is conducted without an external supply of hydrogen.

8. The process of claim 1, wherein the metal oxide catalyst comprises $ZrO_2$.

9. The process of claim 1, wherein the petroleum reservoir supply of acidic crude oil contains an initial density and viscosity and an initial concentration of sulfur and heavy metals;
wherein the low acidity oil has a density and viscosity lower than the density and viscosity of the acidic crude oil; and
wherein concentration of sulfur and heavy metals in the low acidity oil is lower than the concentration of sulfur and heavy metals in the acidic crude oil.

10. The process of claim 1, further comprising the steps of:
recycling the recovered water by combining at least a portion of the recovered water with the water to form the crude oil/water mixture.

11. The process of claim 10, further comprising the steps of
pumping and heating the recovered water to at or above supercritical conditions;
adding oxygen to the recovered water;
treating the recovered water with oxygen at or above supercritical conditions in an oxidation reactor to create a cleaned recovered water stream such that the cleaned recovered water stream contains substantially less hydrocarbon content than the recovered water.

12. The process of claim 11,
wherein the step of treating the recovered water with oxygen in the oxidation reactor creates thermal energy released from oxidation reaction; and
further comprising the step of transferring, through heat exchange, at least a portion of the thermal energy released from oxidation reaction upstream in the process for reducing the acidity of an acidic crude oil.

13. The process of claim 10, wherein the oxygen is supplied by an oxygen source selected from the group of oxygen sources consisting of: air, liquefied oxygen, hydrogen peroxide, organic peroxide and combinations of the same.

14. A process to reducing the acidity of an acidic crude oil at an on-site production facility, comprising the steps of:
pumping the acidic crude oil to a pressure at or exceeding the critical pressure of water to create pressurized acidic crude oil, the pressurized acidic crude oil being maintained at a temperature not to exceed 150° C.;
obtaining a supply of water and pumping the water to a pressure at or exceeding the critical pressure of water and heating the water to a temperature at or above the critical temperature of water to create pressurized water;
at the on-site production facility, mixing the pressurized acidic crude oil and the pressurized water to form a pressurized crude oil/water mixture;
pre-heating the pressurized crude oil/water mixture to about 150° C. to about 350° C. to form a pre-heated mixture;
contacting the preheated mixture with a metal oxide catalyst in a reaction zone and heating the preheated mixture to between about 374° to about 600° C. while maintaining pressure at least at or above about 22.1 MPa for a reaction period of time operable to produce a treated crude oil having a significantly reduced TAN in comparison to the TAN of the acidic crude oil;
cooling the treated crude oil in a cooler;
reducing the pressure of the treated crude oil using a pressure regulating device to create a pressure-reduced treated mixture;
separating the pressure-reduced treated mixture into a gas portion and a liquid portion;
separating the liquid portion into recovered water and low acidity oil; and
collecting the low acidity oil wherein the low acidity oil is an upgraded crude oil having reduced amounts of asphalthene, sulfur, nitrogen or metal containing substances as compared to the acidic crude oil.

15. The process of claim 14, wherein the acidic crude oil and the water are mixed at a weight ratio of about 10:1 to about 1:10.

16. The process of claim 14, wherein the reaction zone comprises a main reactor, and the main reactor is generally vertically in orientation, such that the pressurized crude oil/water mixture flows downwardly through the vertically oriented reactor, such that the pressurized crude oil water mixture flows downwardly through the reaction zone.

17. The process of claim 14, wherein the step of separating the liquid portion into recovered water and low acidity oil further comprises the step of feeding the pressure-reduced treated mixture to an oil-water separation facility, such that the low acidity oil is generally separated from the water.

18. The process of claim 14, wherein the step of mixing the acidic crude oil with water is conducted at an oil:water weight ratio of about 10:1 to about 1:10 to form a crude oil/water mixture.

19. The process of claim 14, wherein the pressure regulating device comprises at least one pressure regulating device.

20. The process of claim 14, wherein the process is conducted without an external supply of hydrogen.

21. The process of claim 14, wherein the metal oxide catalyst comprises $ZrO_2$.

22. The process of claim 14, wherein the petroleum reservoir supply of acidic crude oil contains an initial density and viscosity and an initial concentration of sulfur and heavy metals;
wherein the low acidity oil has a density and viscosity lower than the density and viscosity of the acidic crude oil; and
wherein concentration of sulfur and heavy metals in the low acidity oil is lower than the concentration of sulfur and heavy metals in the acidic crude oil.

23. The process of claim 14, further comprising the steps of:
recycling the recovered water by combining at least a portion of the recovered water with the water to form the crude oil/water mixture.

24. The process of claim 23, further comprising the steps of:
pumping and heating the recovered water to at or above supercritical conditions;
adding oxygen to the recovered water;
treating the recovered water with oxygen at or above supercritical conditions in an oxidation reactor to create a cleaned recovered water stream such that the cleaned recovered water stream contains substantially less hydrocarbon content than the recovered water.

25. The process of claim 23,
wherein the step of treating the recovered water with oxygen in the oxidation reactor creates thermal energy released from oxidation reaction; and further comprising the step of transferring through heat exchange at least a portion of the thermal energy released from oxidation reaction upstream in the process for reducing the acidity of an acidic crude oil.

26. The process of claim 1 where the heating the crude oil/water mixture to a crude oil/water temperature step is performed at a temperature in the range of about 100° C. to about 150° C.

* * * * *